Oct. 11, 1966 S. A. MRENNA ETAL 3,278,710

CIRCUIT INTERRUPTING DEVICE WITH A MOVABLE ARC-HOOD

Filed March 13, 1964 4 Sheets-Sheet 1

CIRCUIT INTERRUPTING DEVICE WITH A MOVABLE ARC-HOOD

Filed March 13, 1964 4 Sheets-Sheet 2

CIRCUIT INTERRUPTING DEVICE WITH A MOVABLE ARC-HOOD

Filed March 13, 1964 4 Sheets-Sheet 3

CIRCUIT INTERRUPTING DEVICE WITH A MOVABLE ARC-HOOD

Filed March 13, 1964 4 Sheets-Sheet 4

3,278,710
CIRCUIT INTERRUPTING DEVICE WITH A MOVABLE ARC-HOOD
Stephen A. Mrenna and Howard E. Reichert, Beaver, Pa., assignors to Westinghouse Electric Corporation, East Pittsburgh, Pa., a corporation of Pennsylvania
Filed Mar. 13, 1964, Ser. No. 351,725
12 Claims. (Cl. 200—144)

This invention relates generally to circuit interrupting devices and more particularly to enclosed safety switches.

For certain applications of circuit interrupting devices, it is desirable, in order to reduce the possibility of accidental contact with live terminals, to cover the terminals with insulating means in such a manner as to not prevent access to the terminals for wiring operations. It is also desirable, in order to save costs and space, to provide compactly constructed circuit interrupting devices.

An object of this invention is to provide an improved circuit interrupting device with an arc-hood that covers the terminals of the device and that is movable to a position exposing the terminals for wiring operations and for adjustment and inspection.

Another object of this invention is to provide a circuit interrupting device comprising cooperable contacts and an arc-hood that covers certain terminals of the device which arc-hood is movable, when the contacts are in the open position, to a wiring position exposing the terminals and preventing operation of the contacts to the closed position.

This invention is particularly advantageous in the art of enclosed safety switches wherein workers must often have access to the inside of the enclosure to adjust the wiring and to inspect or change fuses. The invention is particularly effective in this art because the worker generally has access only through the front of the switch enclosure, and the terminals, which are safely covered from the front, are readily exposed for adjustment and inspection from the front by merely moving the arc-hood to a particular position.

Accordingly, another object of this invention is to provide an enclosed safety switch structure with improved means covering certain terminals of the switch structure and movable out of the covering position in order to expose the terminals for adjustment from the front of the switch structure.

Another object of this invention is to provide an improved enclosed safety switch structure with an arc-hood that covers certain terminals of the device and that is movable to a terminal-exposing position which structure includes means preventing closure of the switch contacts when the arc-hood is in the terminal-exposing position.

A further object of this invention is to provide an enclosed switch structure with improved latching means providing a safer switch installation.

Another object of this invention is to provide an improved enclosed safety switch with a defeatable latch member that is automatically moved into a latching position to latch the cover closed when the cover is moved to the closed position which defeatable latch member operates automatically to latch the switch open when the switch is open and the cover is moved to the open position.

A general object of this invention is to provide an improved relatively inexpensive and compactly constructed enclosed safety switching device.

The novel features that are considered characteristic of this invention are set forth in particular in the appended claims. The invention itself, however, both as to structure and operation, together with additional objects and advantages thereof, will be best understood from the following detailed description when read in conjunction with the accompanying drawings.

Figures 1, 6, 7, 8:
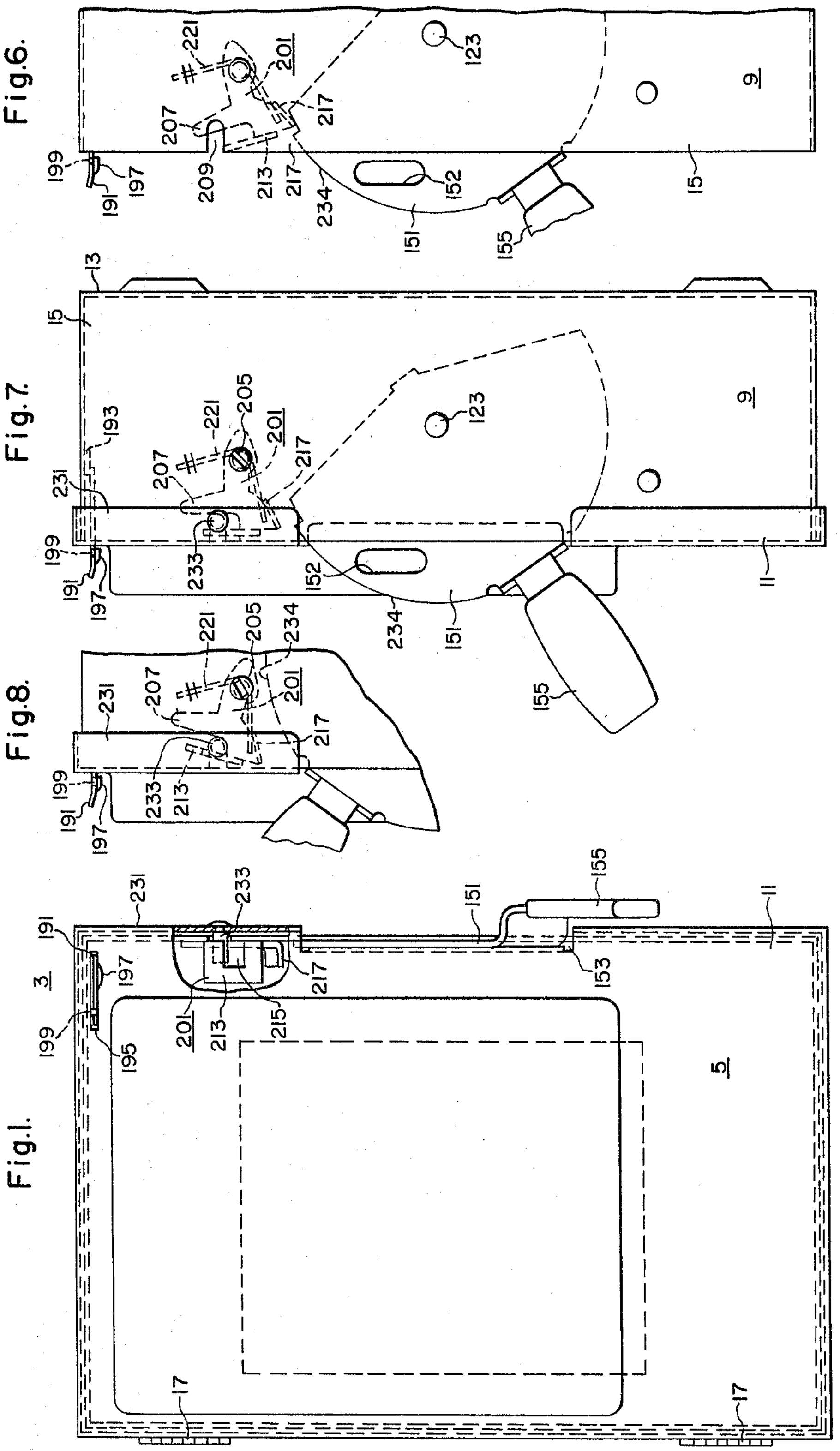
FIGURE 1 is a plan view, with parts broken away, of an enclosed switching device embodying principles of this invention.
FIGS. 6, 7 and 8 are partial views illustrating certain operating positions of the latching means of this invention.
Figures 2, 3:
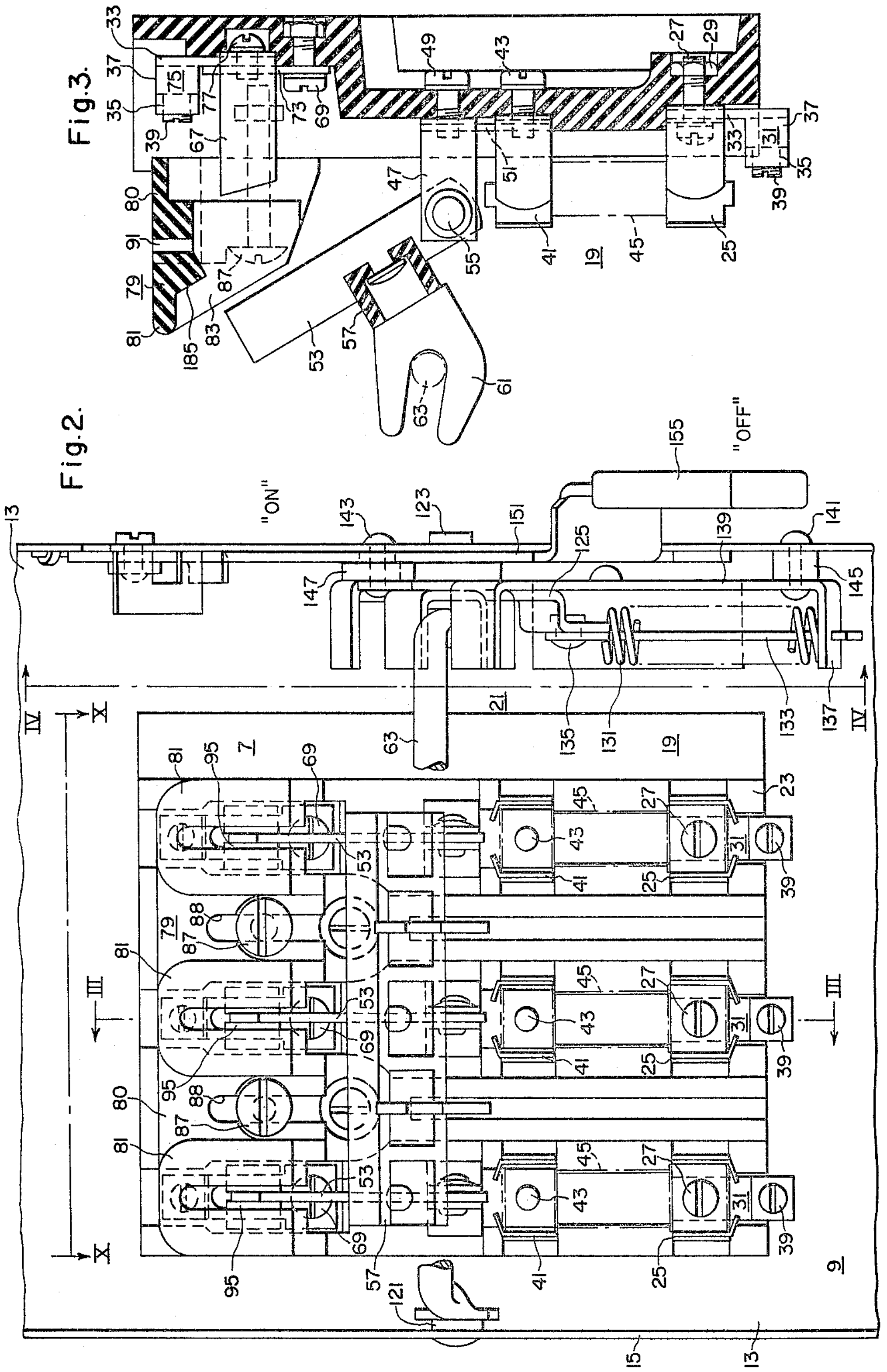
FIG. 2 is a partial plan view, with the cover and certain other parts broken away, of the enclosed switching device seen in FIG. 1.
FIG. 3 is a sectional view taken generally along the line III—III of FIG. 2.

Referring to the drawings, there is shown, in FIGS. 1 and 2 an enclosed safety switch 3 comprising an enclosure 5 and a switching device 7. The enclosure 5 comprises a receptacle 9 (FIG. 7) and an openable cover 11. The receptacle 9 comprises a sheet metal base 13 and four sheet metal side walls 15 extending up from the base to form an opening at the front of the receptacle. The cover 11 is pivotally supported on hinges 17 (FIG. 1) to enable the receptacle 9 to be opened and closed in a manner well known in the art.

Referring to FIGS. 2 and 3, the switching device 7 comprises a switch structure 19 and an operating mechanism 21. The switch structure 19 comprises a unitary insulating base or support member 23 that is fixedly secured to the enclosure base 13 by suitable securing means.

As can be seen in FIG. 2, the switch structure 19 comprises three similar pole units disposed in a generally side-by-side relationship. Each of the pole units comprises a first fuse clip 25 that is secured to the insulating support 23 by means of a bolt 27 and nut 29. The bolt 27 and nut 29 also secure a terminal device indicated generally at 31 to the insulating support 23. The terminal device 31 is a conducting structure comprising an elongated part 33 that has an opening therein through which the bolt 27 passes. The terminal device 31 also comprises a block part 35 having a generally horizontal end opening 37 (FIGS. 3 and 10) therein and a vertical tapped front opening therein into which a threaded pressure securing member 39 is screwed.

Each pole unit of the switch device also comprises a fuse clip 41 that is supported to the insulating support 23 by means of a screw 43. A fuse, indicated in broken lines, is clipped into each pair of fuse clips 25, 41 in a well-known manner. Each pole unit also comprises a conducting contact support clip 47 that is secured to the insulating block 23 by means of a screw 49. A conducting strip 51 is secured in place by means of the screws 43 and 49, to electrically connect each fuse clip 41 with the associated contact support clip 47. A generally flat conducting movable contact member 53 is pivotally supported on each of the contact supports 47 by means of a pivot pin 55. Each of the three moving contact arms 53 is fixedly secured to a common insulating tie bar 57 by means of a rivet 59. In between each pair of adjacent contact arms 53, a metallic bifurcated connecting member 61 is fixedly secured to the common insulating tie bar 57. An operating rod 63 is disposed within the bifurcations of each of the two connecting members 61. The operating rod 63 is movable between two operating positions to operatively move the common tie bar 57 to simultaneously pivot all three of the movable contact members 53 to the open and closed positions in a manner to be hereinafter more specifically described.

In each pole unit, the flat knife-blade type contact 53 cooperates with a generally U-shaped stationary contact 67 that comprises two spaced generally resilient conducting legs that resiliently engage the opposite flat sides of the associated contact arm 53 in the closed position of the contacts. Each stationary contact 67 is secured to the insulating support 23 by means of a screw 69 and nut 71 that serve to bias a conducting plate 73 into engagement with a front surface of the support 23 to secure the stationary contact 67 and a terminal structure 75 to the front of the support 23. Each pole unit is provided with a terminal structure 75 that is constructed similar to the previously described terminal structure 31. For this reason, the same specific reference characters are used to identify parts of both of the terminals 31 and 75. In each pole unit, the stationary contact structure 67 and terminal structure 75 are secured together by means of a screw 77 that passes through an opening in the base of the contact 67 and through an opening in the conducting extension 33 of the terminal structure 75 to be threaded into a tapped opening in a conducting plate 73.

Figure 10:
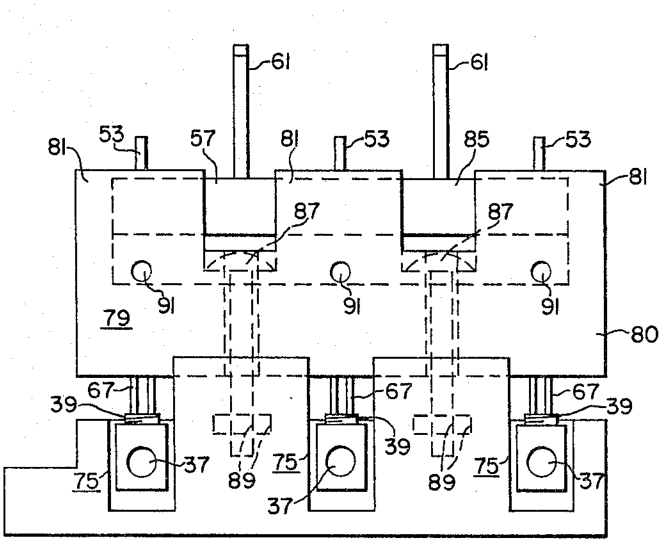
FIG. 10 is an end view taken generally along the line X—X of FIG. 2; the figure being shown in the upright position in FIG. 10.
Figure 9:
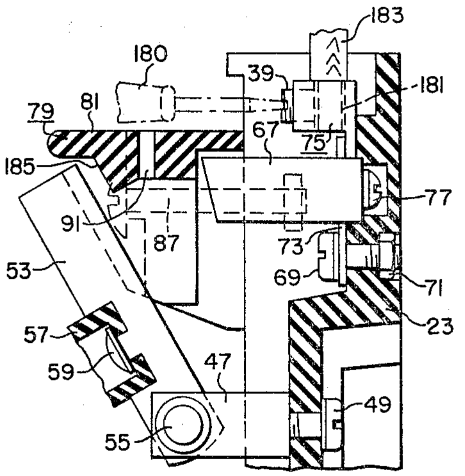
FIG. 9 is a partial sectional view similar to FIG. 3 showing the arc-hood device in the retracted position.

A common insulating arc-shield or arc-hood structure 79 is supported on the front of the insulating support 23. The insulating arc-hood structure 79 (FIGS. 2, 3, 9 and 10) comprises a unitary insulating block 80 formed with three arc-hoods 81 each of which arc-hoods forms a cavity 83. A recess 85 (FIG. 10) is provided between each pair of adjacent arc-hoods 81. A mounting screw 87, which is disposed in each of the recesses 85, passes through an elongated slot 88 in the insulating block 81. Each of the screws 87 is threaded into a tapped opening 89 (FIG. 10) in the supporting block 23 whereby the two screws 87 secure the arc-hood structure 79 to the insulating support 23. As best seen in FIGS. 3, 9 and 10, an opening 91 is provided in each of the arc-hoods 81 to vent the gases from the arc-hood cavity 83.

As is best seen in FIG. 2, a relatively narrow slot 95 is provided in the front of each of the arc-hoods 81 of the arc-extinguishing device 79 to permit movement of the associated knife-blade type contact 53 into and out of the associated arc-hood cavity 83 so that the contact can be moved into and out of engagement with the associated stationary contact 67. The insulating arc-extinguishing device 79 disclosed in FIGS. 2, 3, and 10 comprises three insulating cavities 83 in which three arcs are drawn and extinguished when the switch is operated to the open position. The arc gases are forced out of the cavities 83 under pressure through opening 91.

Figure 11:
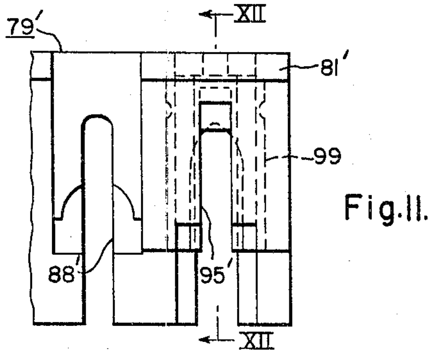
FIG. 11 is a partial plan view illustrating a modified form of the switch arc-hood.
Figure 12:
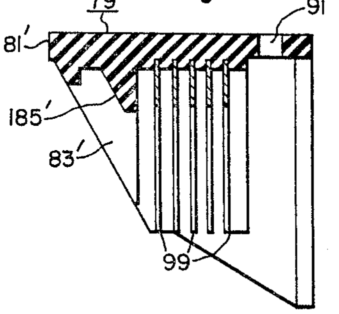
FIG. 12 is a sectional view taken generally along the line XII—XII of FIG. 11.

A modified form of the arc-hood structure is disclosed in FIGS. 11 and 12 wherein those parts which are generally similar to the parts of the arc-hood device 79 (FIG. 2) are identified by means of reference characters that, except for being primed, are the same as the reference characters of the FIG. 2 device. Each of the cavities 83' of the three arc-hoods 81' (only one arc-hood being illustrated in FIGS. 11 and 12) of the arc-hood device 79' is provided with a plurality of notches to receive and support a plurality of generally U-shaped magnetic plates 99. The openings in the U-shaped plates are aligned to receive the associated movable contact arm. During opening operations the associated arc is drawn into the bight portions of the magnetic arc plates 99 to be extinguished in a manner well-known in the art. The arc-hood device 79' is mounted on the insulating support in the same manner as is herein set forth regarding the arc-hood device 79.

Figure 4:
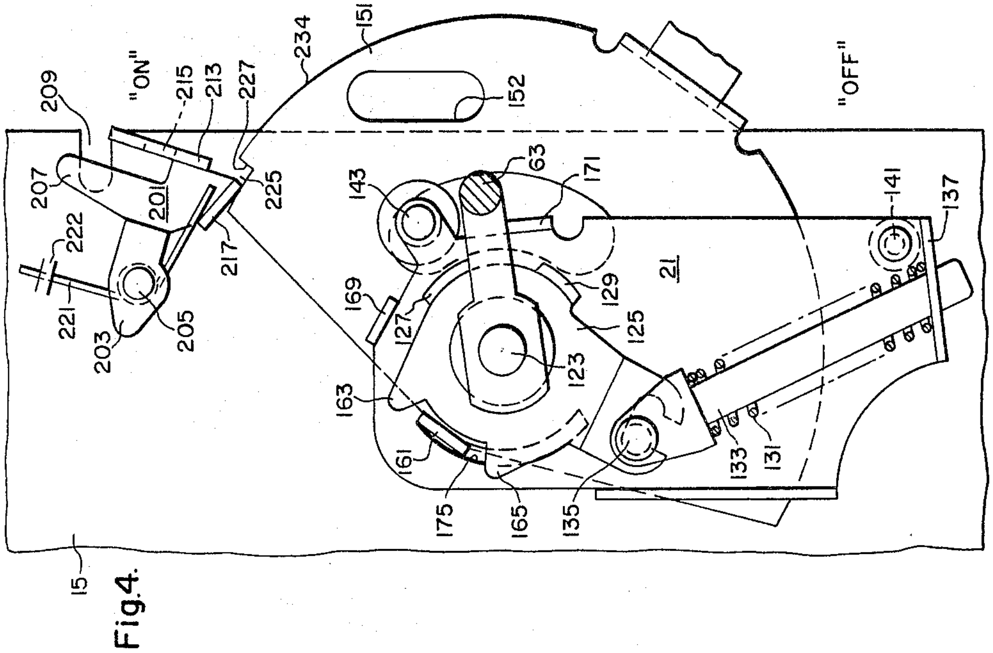
FIG. 4 is a partial sectional view taken generally along the line IV—IV of FIG. 2.
Figure 5:
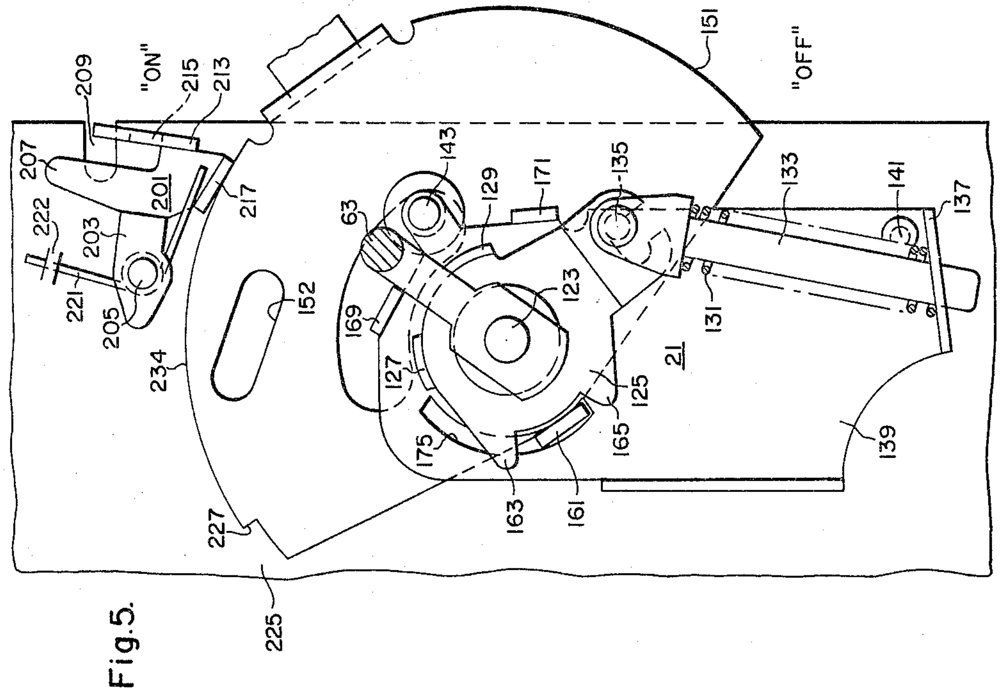
FIG. 5 is a view similar to FIG. 4 showing the switch operating mechanism in the closed position.

Referring to FIGS. 2, 4 and 5, the operating rod 63 is operated to simultaneously operate the three movable contacts 53 by operation of the operating mechanism 21. The operating rod 63 is a generally U-shaped member that is pivotally supported on the opposite side walls of the receptacle 9. As can be seen in FIG. 2, one leg of the operating rod 63 is pivotally supported on a pin 121 and the other leg is pivotally supported on a pin 123. The operating rod 63 is operated by operation of an actuating member 125 (FIGS. 4 and 5) that is also pivotally supported on the pin 123. The actuating member 125 has two projections 127 and 129 that extend from the main plane of the generally flat member 125 and engage one leg of the operating rod 63 to move the rod in a manner to be hereinafter specifically described. Snap action of the operating mechanism is effected by means of a compression spring 131 that is supported on a rod structure 133 that is pivotally supported at one end on the actuating member 125 by means of a pin 135. The other end of the rod structure 133 protrudes through an opening in a flange 137 of a stationary supporting bracket 139. The bracket 139 is rigidly supported on the side wall of the receptacle by means of rivets 141 and 143. As can be seen in FIG. 2, spacers 145 and 147 are provided on the rivets 141 and 143 respectively to space the bracket 139 relative to the receptacle sidewall 15. A generally flat operating member 151 protrudes through an opening 153 (FIG. 1) in the cover 11 and an external operating handle 155 (FIGS. 1 and 2) is provided on the operating member 151 to permit manual operation of the switching device when the cover 11 is in either the closed or opened position. The member 151 has an elongated opening 152 therein to receive the hasps of from one to three padlocks which may be used to lock the member in the off position and, if the cover is closed, to lock the cover in the closed position. As can be seen in FIGS. 4 and 5, the member 151 is pivotally supported on the pivot pin 123 and a projection 161, that is bent-over at the bottom of the member 151 is disposed between two leg portions 163 and 165 on the actuating member 125. Two bent-over projections 169 and 171 are provided on the supporting bracket 139 to limit movement of the operating rod 63 in the two operating positions. As is seen in FIGS. 4 and 5, the extension 161 protrudes through an opening 175 in the stationary bracket 139.

The switch operating mechanisms is shown in the on or closed position in FIG. 5. When the switch is connected and in the closed position, the circuit in each pole unit extends from a line conductor (not shown in FIG. 2) that would be attached to the solderless terminal connector 75 by means of the screw-type connector 39, through the conducting strip 33, the stationary contact 67, the movable contact 53, the conducting contact support 47, the conductor 51, the fuse clip 41, the fuse 45, the fuse clip 25, the conducting strip portion 33 of the terminal connector 31, the load terminal connector 31, to the conductor (not shown) that would be connected to the load terminal connector 31 by means of the screw type connector 39.

In order to operate the switch to the open-circuit position (FIGS. 2–4), the external operating handle 155 (FIG. 2) is rotated from the on to the off position to rotate the operating member 151 in a clockwise (FIG. 5) direction about the pivot 123. During this motion, the projection 161 on the operating member 151 engages the foot 163 on the actuating member 125 to rotate the actuating member in a clockwise (FIG. 5) direction about the pivot 123 during which motion the operating rod 133 is moved from the FIG. 5 to the FIG. 4 position, the spring 131 is initially compressed and then it passes an over-center position to discharge to move the parts to the FIG. 4 position with a snap-action. As the member 125 moves from the FIG. 5 to the FIG. 4 position, the extension 127 on the member 125 engages the leg of the operating rod 63 to move the operating rod 63 in a clockwise (FIG. 5) direction about the pivot 123 to the off or open circuit position in which it is seen in FIG. 4. In order to close the switch structure, the operating member 151 is rotated in a counterclockwise direction whereupon the extension 161 engages the leg 165 of the actuating member 125 to pivot the actuating member 125 counterclockwise about the pivot pin 123 from the FIG. 4 to the FIG. 5 position during which movement the overcenter spring 131 is actuated to the FIG. 5 position to move the member 125 to the FIG. 5 position with a snap-action. As the member 125 moves from the FIG. 4 to the FIG. 5 position, the extension 129 thereon engages the leg of the operating rod 63 to rotate the rod 63 in a counterclockwise direction to the closed position seen in FIG. 5.

Referring to FIGS. 2 and 3, when the operating rod 63 is moved to the off or open position, the rod 63 moves the two connecting members 61 to thereby move the insulating tie bar 57 to thereby simultaneously pivot the three movable contacts 53 about the pivots 55 to open position seen in FIGS. 2 and 3. When the operating mechanism is operated to the on or closed position, the operating rod 63 is moved to move the tie bar 57 to simultaneously pivot the three movable contacts 53 about the pivots 55 to the closed position in which position each of the knife-blade type movable contacts is disposed between and engages the resilient twin conducting members of the stationary clip-type contact structure 67 in a manner well known in the art.

When the switch is operated to the off position to open a circuit an arc is drawn between each movable contact 53 and the associated stationary contact 67 which arc will be extinguished within the associated arc-hood of the arc-extinguishing structure 79. The gases generated during extinction of the arc are expelled at the end of the breaker in each pole unit through the associated opening 91.

Referring to FIGS. 1 and 2, it will be noted that the receptacle part of the enclosure is opened at the front by pivotal movement of the cover 11 about the hinges 17. As can be seen in FIGS. 2 and 3, when the cover 11 is in the open position, the insulating arc-hood device 79 covers, from the front, the stationary contacts 67 and also the line terminals 75. When it is desired to adjust or wire the line terminals 75, a worker, who has access to the device from the front of the receptacle, loosens the screws 87 (FIGS. 2 and 3) and rectilinearly slides the arc-hood device 79 on the front of the insulating support 23 from the position seen in FIG. 2 to the position seen in FIG. 9. With the arc-hood device 79 in the position shown in FIG. 9, the terminals 75 are exposed and a worker can insert a screwdriver 180 into the front slot in each of the screw-type pressure members 39 to thereby connect a conducting wire 181 of an insulated line conductor 183 to the line terminal 75. As can be seen in FIG. 9, the conducting wire 181 is disposed in the horizontal opening 37 (FIG. 10) and the threaded member 39 is screwed into a tapped vertical opening in the terminal 75 to apply pressure to the wire 181 to thereby physically and electrically connect the conducting wire 181 to the line terminal 75. As can be seen in FIG. 9, if an attempt is made to close the switch when the arc-hood device 79 is in the retracted or uncovering position, each of the three contacts 53 will engage a different one of three ledges 185 on the arc-hood device 79 to prevent closing of the contacts. Thus, with the arc-hood structure in the retracted position, the switch cannot be operated accidentally to the closed position. After the three line terminals 75 have been properly wired, the arc-hood device 79 is moved rectilinearly with a sliding motion on the front of the insulating base 23 from the position in which it is seen in FIG. 9 to the position seen in FIG. 3. Thereafter, the screws 87 are tightened to secure the arc-hood device 79 in the position disclosed in FIG. 3 and the switch structure can be operated in the same manner hereinbefore described. As can be seen in FIG. 2, the elongated slots 88 and the screws 87 cooperate to provide guide means to guide the rectilinear sliding motion of the arc-hood device 79 on the front of the insulating support member 23.

As can be seen in FIG. 3, the line terminals 75 and also the stationary contacts 67, which parts are live when the switch is open, are substantially covered by means of the insulating arc-hood device 79.

When the arc-hood device 79 is in the position shown in FIG. 3 and the switch is in the closed position, the two support members 61 cover the two screws 87 to prevent loosening of the screws to thereby prevent a worker from moving the arc-hood device 79 to the retracted position when the switch is in the closed circuit position.

Referring to FIGS. 1 and 6–8, a resilient cover latching member 191 is welded or otherwise rigidly secured to one of the internal side walls of the receptacle 9 and it is bent over at 193 (FIG. 7) so that the main part thereof is disposed along a plane that is parallel to and spaced from the side wall to which the member is secured. As can be seen in FIG. 1, the cover 11 has an opening or elongated slot 195 therein and the generally resilient cover latch 191 is provided with a tang portion 197 bent over and formed in the member by means of a stamping operation. When the cover 11 is moved to the closed position, the cover engages the tang 197 to flex the resilient member 191 and when the cover reaches the fully closed position the resilient member 191 snaps back into the latching position wherein the tang 197 is disposed over a portion of the cover to latch the cover in the closed position. An opening 199 is provided in the latch 191 to receive the hasp of a padlock so that the cover can be padlocked in the closed position. When it is desired to open the cover, if there is a padlock secured to the member 191, the padlock is removed and the member 191 is manually flexed to a position aligning the tang 197 with the cover opening 195 and the cover is then pivoted to the open position.

There is shown, in FIGS. 4 and 5, a latching member 201 comprising a unitary sheet-metal type member formed with a supporting leg 203 having a pivot pin 205 thereon that extends through an opening in the sidewall 15 to pivotally support the member 201 on the one side wall 15 of the receptacle 9. The unitary latch member 201 is provided with a projecting part 207 that is disposed adjacent a slot 209 in the upper part of the side wall 15. The latching member 201 is also provided with a first latching part 213 that is bent over from the plane of the part 207 (FIG. 1) which part 213 has an opening 215 therein for a purpose to be hereinafter specifically described. The latching member 201 is also provided with a second latching part 217 thereon bent over and extending out of the plane in which the part 207 is disposed (FIG. 4, 5 and 1). As can be seen in FIG. 4, when the switch is in the off or open circuit position, and the enclosure cover is in the open position, a torsion spring 221 that is fixed at one end in a part 222 of the side wall 15, and that engages the projection 217 at the other end thereof, biases the latching member 201 in a clockwise (FIG. 4) direction to move the latching part 217 into a notch 225 in the operating member 151 so that if there is an attempt to move the operating member 151 from the off to the on position, the latching part 217 will engage a ledge 227 on the operating member 151 to prevent this operative closing movement of the operating member 151. As can be seen in FIG. 4, the pivot 205 is to the left of the line of action between the part 227 of the member 151 and the latching part 217 of the latch member 201 so that the force of rotation of the member 151 will operate through pivot 205 preventing movement of the operating member 151 to the on or circuit closed position. Referring to FIGS. 1, 7 and 8, the cover 11 is provided with a flange part 231 and a pin 233 is welded or otherwise rigidly secured to the flange part 231. When the cover 11 is pivoted to the closed position, the pin 233, that is secured to the cover, moves into the slot 209 (FIGS. 4, 5 and 6) in the side wall 15 and engages the projecting portion 207 of the latch member 201 to rotate the latch member against the bias of the torsion spring 221 to a position wherein the latching projection 217 clears the notch 225 so that when the cover 11 is moved to the closed position, the switch operating member 151 can be freely operated between the on and the off positions. If the circuit interrupter is off when the cover 11 is moved to the open position, the pin 233 will release the portion 207 whereupon the spring 221 will automatically move the member 201 back to the latching position seen in FIG. 4. If the circuit interrupter is on or closed when the cover is moved to the open position, the spring 221 will move the latching member 201 to a position wherein the projection 217 engages the outer surface or edge 234 of the member 151 so that, if the switch is thereafter moved to the off position, the spring 221 will automatically snap the member 201 back to the latching position seen in FIG. 4 when the edge 227 clears the projection 217. Thus, the circuit interrupter will again be latched in the off position.

Referring to FIG. 4, the parts are shown therein with the switch off and the cover open. When the cover 11 is moved into the closed position, the pin 233 (FIGS. 1 and 6–8) that is attached thereto engages the projection 207 (FIG. 4) to rotate the member 201 to clear the latch part 217 from the notch 225 of the operating member 151 in the manner hereinbefore described. As the latch member 201 rotates, the extension or latching projection 213 thereon moves over top of the pin 233 to the position seen in FIG. 1. If the enclosed switch is in the off position and the cover is moved to the open position, as the pin 233 moves away from the part 207 (FIG. 4) the torsion spring 221 will rotate the latch 201 to the position seen in FIG. 4 and the extension 213 will be rotated out of the latching position over top of the pin 233 so that the pin 233 and cover 211 will be readily moved to the open position. If, however, the switch is moved to the on or closed position when the cover is in the closed position, the extension or projection 217 on the member 201 will engage the outer edge 234 of the member 151 so that the spring 221 will not be able to rotate the latch member 201 to the unlatching position seen in FIG. 4 and the projection 213 will overlie and engage the pin 233 (FIG. 1) to prevent opening of the cover 11 when the switch structure is in the on or closed position. An authorized worker will readily know how to defeat this latching function. As can be seen in FIGS. 7 and 8, the pin 205, which is pivotally supported in an opening in the side wall 15 and to which the latch member 201 is attached, has an external slot therein to receive a screw driver or other tool. Thus, when the switch and cover are both closed, an authorized worker can rotate the member 201 to a position wherein the opening 215 (FIG. 1) is aligned with the pin 233 and the worker can then release the latch 191 and pivot the cover to the open position with the pin 233 moving through the opening 215 (FIG. 1) of the latch member 201. With the torsion spring 221 biasing the latch 201 into the latching position, it can be understood that a worker will hold the latch 201 with one hand and operate the cover latch 191 with the other hand to release the cover 11 so that the cover 11 can be operated to the open position.

The cover 11 can be moved into the closed position when the enclosed switch is in the on position. When the parts are in the position seen in FIG. 5, the cover is open and the switch is in the on or closed position. If the cover 11 is moved to the closed position, the pin 233 on the cover will engage the top of the projection 213 and pivot the latch member 201 in a counterclockwise (FIG. 5) direction against the bias of the spring 221 until the pin 233 is aligned with the opening 215 (FIG. 1) whereupon the pin will move through the opening 215 as the cover is moved into the closed position, and when the cover has reached the closed position the spring 221 will automatically move the latch 201 in a clockwise (FIG. 5) direction back to the latching position which clockwise latching movement will be stopped by engagement of the projection 217 against the edge 234 of the operating member 151. The projection 213 will then be disposed over the pin 233 (FIG. 1) to again latch the cover in the closed position in the same manner hereinbefore described.

From the foregoing, it can be understood that there is provided, by this invention, an improved circuit interrupting device or switch comprising an arc-hood structure that covers the line terminals of the device in one position and that is movable to a retracted position to expose the terminals for inspection, adjustment or connection. When the arc-hood device is in the covering position, it also covers the stationary contacts that are connected to the covered line terminals. The switch comprises an insulating support block with certain parts of the circuit interrupter supported on the front of the support block. Two screw members extend through elongated slots in the insulating arc-hood device to secure the arc-hood device to the front of the insulating support. When the switch is in the closed position, the screw members are covered by part of the switch operating mechanism. When the switch is operated to the off or open circuit position, the screw members become exposed and they can be loosened to enable movement of the arc-hood structure to the position exposing the terminals. When the arc-hood structure is in the retracted or exposing position, ledges thereon will engage the movable contacts to prevent the switch from being accidentally operated to the on or closed circuit position. When the exposed terminals have been wired, inspected or adjusted, a worker can then move the arc-hood structure back to the covering and operating position and then tighten the screws to secure the parts in place. Thereafter, if there are no other interlocks latching the switch, the switch can be freely operated.

The invention has particular utility as an enclosed safety switch wherein the switch is mounted in a receptacle having a covered opening at the front thereof. In this embodiment, the switch is accessible only from the front of the enclosure and, since the line terminals and stationary contacts are covered by the arc-hood structure from the front of the switch, when the switch is in the open-circuit position, a worker can have access to the internal part of the enclosure with less risk of coming in contact with live parts.

An improved latch comprising a unitary pivotally supported spring biased member serves to defeatably latch the switch in the off or open position when the enclosure cover is opened and to defeatably latch the enclosure cover closed when the switch is in the on or closed position and the cover is in the closed position. When the enclosure cover is opened and the switch is closed, the cover can be moved into the closed position during which movement the latch member will be cammed to a position permitting closing of the cover, and when the cover reaches the closed position the latching member will automatically be moved to a position latching the cover in the closed position. When the cover is in the closed position, the enclosed switch can be freely manually operated by means of the external operating handle. The operating member is also provided with means for receiving at least three padlocks to permit the switch to be padlocked in the open position. If the switch is padlocked in the open position with the enclosure cover closed, this padlocking operation will also serve to lock the cover in the closed position. The enclosure is also provided with a resilient cover latch that is spaced from the pivotally supported latch and that must be operated in order to permit the cover to be opened. Since the two latch members are in a spaced relationship and because they are both spring biased toward the latching position, a worker must operate both of the latch members simultaneously in order to effectively unlatch the cover for a cover opening operation. Thus, it is less likely that an unauthorized person will be readily able to either accidentally or intentionally open the enclosure cover. The resilient latching member also has an opening therein for receiving a padlock to permit the cover to be padlocked in the closed position.

While the invention has been disclosed in accordance with the provisions of the patent statutes, it is to be understood that various changes in the structural details and arrangements and parts may be made without departing from some of the essential features of the invention. It is desired, therefore, that the language of the appended claims be given as reasonably broad an interpretation as the prior art permits.

We claim as our invention:

1. A control device comprising a pair of contacts, means for operating said contacts between opened and closed positions, a terminal structure for enabling connection of said contacts in an electric circuit, an arc-hood structure disposed in a first position to receive the arc established when said contacts are operated to the open position, said arc-hood structure in said first position covering said terminal structure, said arc-hood structure being rectilinearly movable to a second position uncovering said terminal structure, and said control device comprising guide means restraining said arc-hood structure for rectilinear movement.

2. A control device comprising a pair of contacts, means for operating said contacts between open and closed positions, a manually adjustable terminal device for enabling connection of said contacts in an electric circuit, an arc-hood structure disposed in a first position to receive the arc established when said contacts are operated to an open position, said arc-hood structure in said first position covering said terminal device, said arc-hood structure being movable to a second position when said contacts are open uncovering said terminal device, and means preventing operation of said contacts to the closed position when said arc-hood structure is in said second position.

3. A control device comprising insulating support means, a stationary contact structure mounted on the front of said insulating support means, an arc-hood device supported on the front of said insulating support means in a first position, said stationary contact structure being disposed generally within said arc-hood device, a movable contact structure, means for moving said movable contact structure in said arc-hood device into and out of engagement with said stationary contact structure, terminal means supported on said insulating support means under said arc-hood device, said arc-hood device being movable from said first position to a second position uncovering said terminal means, and means on said arc-hood device operating when said arc-hood device is in said second position to prevent movement of said movable contact structure into engagement with said stationary contact structure.

4. A control device comprising insulating base means, a stationary contact structure supported on the front of said insulating base means, a solderless terminal device adjustable from the front thereof and supported at the front of said insulating base means, an arc-hood device, means securing said arc-hood device at the front of said insulating base means in a first position covering said solderless terminal device from the front, a movable contact structure movable in said first positioned arc-hood device and movable between an open position out of engagement with said stationary contact structure and a closed position in engagement with said stationary contact structure, when said movable contact structure is in said open position said securing means being releasable and thereafter said arc-hood device being slidable on said insulating base means to second position uncovering said solderless terminal device from the front, and said arc-hood device comprising stop means engageable by said movable contact structure prevent said movable contact structure from being moved to the closed position when said arc hood device is in said second position.

5. A control device comprising insulating base means, three stationary contact structures supported at the front of said insulating base means in a side-by-side relationship, a separate adjustable terminal device supported at the front of said insulating base means in proximity to each of said stationary contact structures, an arc-hood device supported at the front of said insulating base means in a first position, said arc-hood device comprising a unitary insulating member having an arc-shield part for each of said stationary contact structures which arc-shield part substantially covers both the associated stationary contact structure and the associated terminal device when said arc-hood device is in said first position, movable contact means comprising a separate movable contact structure cooperable with each of said stationary contact structures and means for simultaneously moving said movable contact structures into and out of engagement with their associated stationary contact structures, each of said movable contact structures moving within the associated arc-hood device, when said movable contact structures are in the open position out of engagement with their associated stationary contact structures said arc-hood device being movable to a second position uncovering said three terminal devices, each of said terminal devices comprising an adjustable structure adjustable by means of a tool from the front of said insulating base means when said arc-hood device is in said second position, and said arc-hood device comprising stop means to prevent operation of said movable contact means to the closed position when said arc-hood device is in said second position.

6. An enclosed control structure comprising, in combination, an enclosure comprising a receptacle and an openable cover, said receptacle comprising a generally planar base and side wall means extending from said base to form an opening at the front thereof, said openable cover being movable to open and close said opening, a control device comprising insulating support means supported on said base, a pair of contacts supported on said insulating support means, means for operating said contacts between open and closed positions, a terminal device supported on said insulating support means for enabling connection of said contacts in an electric circuit, an arc-hood structure in a first position in which position said arc-hood structure receives the arcs established when said contacts are operated to the open position, said arc-hood structure in said first position covering said terminal device, said arc-hood structure having a pair of spaced parallel elongated slots therein, a separate fastening member passing through each of said slots, said fastening members being in fastening positions to secure said arc-hood structure in said first position, said fastening members being adjustable to non-fastening position, when said fastening members are in said non-fastening positions, said arc-hood structure being rectilinearly movable to a second position uncovering said terminal device to expose said terminal device for adjustment from the front of said receptacle, and said elongated slots and said fastening members cooperating to provide guide means guiding said arc-hood structure for rectilinear movement.

7. An enclosed control structure comprising an enclosure comprising a receptacle and an openable cover, said receptacle comprising a generally planar base and side wall means extending generally normal to said base and forming an opening opposite said base at the front of said receptacle, said openable cover being supported to open and close said opening, a control device supported within said receptacle and comprising insulating support means supported on said base, a pair of contacts supported on said insulating support means, means operable to operate said contacts between open and closed positions, a terminal device for enabling connection of said contacts in an electrical circuit, said terminal device comprising a member adjustable at the front thereof, an arc-hood structure in a first position on said insulating support means to receive the arc established when said contacts are operated to the open position, said arc-hood structure in said first position covering the front of said terminal device, said arc-hood structure being movable on said insulating support means to a second position uncovering the front of said terminal device, and means preventing operation at said contacts to the closed position when said arc-hood structure is in said second position.

8. An enclosed control structure comprising an enclosure, said enclosure comprising a receptacle and an openable cover, said receptacle comprising a generally planar base and side wall means extending from said base to form an opening at the front of said receptacle opposite said base, said cover being movable to open and close said opening, a control device supported within said receptacle and comprising insulating support means, a stationary contact structure supported on the front of said insulating support means, a terminal device supported on said insulating support means in proximity to said stationary contact structure and comprising a conducting structure having an opening therein at the end thereof and an adjustable member at the front thereof adjustable to effect a pressure connection between said terminal device and a conducting wire that would be disposed in said opening at the installation, an arc-hood device having opening means therein and being supported on the front of said insulating support means in a first posititon substantially covering both said stationary contact structure and said terminal device, a movable contact structure movable in said arc-hood device and movable into and out of engagement with said stationary contact structure, securing means passing through said opening means and securing said arc-hood structure to said insulating support means, said securing means being loosenable to a loosened position and thereafter said arc-hood structure being movable on said insulating support means to a second position on said insulating support means uncovering said terminal device to expose said adjustable member of said terminal device from the front of said open receptacle to thereby permit inspection and adjustment of said terminal device, said opening means being elongated to permit said movement of said arc-hood structure to said second position on said insulating support means when said securing means is in said loosened position, and said arc-hood structure comprising stop means serving to prevent operation of said movable contact structure to the closed position when said arc-hood structure is in said second position on said insulating support means.

9. An enclosed control structure comprising an enclosure, said enclosure comprising a receptacle and an openable cover, said receptacle comprising a generally planar base and four generally planar side walls extending from said base to form an opening at the front of said receptacle opposite said base, said cover being movable to open and close said opening, a control device supported within said receptacle on said base and comprising insulating support means secured to said base, three stationary contact structures supported on the front of said insulating support means in a side-by-side relationship, a terminal structure for each of said stationary contact structures and supported on the front of said insulating suport means adjacent the associated stationary contact structure, each of said terminal structures comprising a terminal member having an opening at the end thereof and an adjusting screw at the front thereof adjustable to connect and disconnect to the terminal member a conductor that may be positioned in the opening at the end of the terminal member, a unitary arc-hood device supported on the front of said insulating support means and comprising an insulating arc-shield for each of said stationary contact structures, movable contact means comprising three movable contact members one for each of said stationary contact structure and means for simultaneously moving said contact members into and out of engagement with the associated stationary contact structures, each of said movable contact members being operatively movable within the associated arc-shield, means securing said arc-hood device in a first position in which position each of said arc-shields substantially covers both the associated stationary contact structure and the associated terminal device, said securing means being releasable and thereafter said arc-hood structure being movable to a second position in which said three terminal structure are exposed so that said three adjusting screws are uncovered from the front of said receptacle, said arc-hood device being movable from said first position to said second position with a generally rectilinear and sliding movement on said insulating base means, and said arc-hood structure comprising stop means engageable to prevent operation of said movable contact structures to the closed position when said arc-hood structure is in said second position.

10. A control device comprising insulating support means, a control device mechanism supported on said insulating support means, said mechanism comprising a pair of contacts and means for operating said contacts between opened and closed positions, a manually adjustable terminal device supported on said insulating support means and being adjustable to connect a conducting member to said terminal device to thereby connect said contacts in an electric current, an arc-hood structure disposed in a first position on said insulating support means to receive the arc established when said contacts are operated to an open position, securing means in a securing position securing said arc-hood structure against movement in said first position on said insulating support means, said arc-hood structure in said first position covering said terminal device, said securing means being adjustable to another position to permit movement of said arc-hood structure, when said securing means is in said other position said arc-hood structure being rectilinearly movable when said contacts are open to a second position on said insulating support means, when said arc-hood structure is in said second position on said insulating support means said terminal device being uncovered and accessible for adjustment, said control device comprising guide means restraining said arc-hood structure for rectilinear movement on said insulating support means from said first position to said second position, and means preventing operation of said contacts to the closed position when said arc-hood structure is in said second position.

11. A control device comprising insulating support means, a control device mechanism supported on said insulating support means, said control device mechanism comprising a pair of contacts and means operable from the front of said insulating support means to open and close said contacts, an arc-hood structure disposed at the front of said insulating support means in a first position on said insulating support means, a terminal device supported on said insulating support means and being manually front-adjustable to connect a conductor thereto to thereby connect said contacts in electrical series with said conductor, said arc-hood structure having a pair of elongated slots therein, a pair of fastening members disposed in said slots to secure said arc-hood structure against movement on said insulating support means in said first position, said fastening members being loosenable to a non-securing position, when said contacts are open and said fastening members are in said non-securing position said arc-hood structure being slidable rectilinearly to a second position on said insulating support means, said sliding rectilinear movement being guided by said fastening members in said elongated slots, when said arc-hood structure is in said second position said terminal device being uncovered and accessible from manual front-adjustment, and said arc-hood structure comprising stop means preventing operation of said contacts to the closed position when said arc-hood structure is in said second position on said insulating support means.

12. A control device comprising insulating support means, three stationary contact structures supported at the front of said insulating support means in a side-by-side relationship, a separate movable contact structure co-operable with each of said stationary contact structures, means for simultaneously moving said movable contact structures into and out of engagement with their associated stationary contact structures, a separate front-adjustable terminal device supported on said insulating support means in proximity to each of said stationary contact structures, an arc-hood device disposed at the front of said insulating support means in a first position covering said front-adjustable terminal devices, said arc-hood device in said first position being positioned to permit movement of said movable contact structures therein and to receive therein the arcs generated when said contacts are separated, securing means in a securing position securing said arc-hood device against movement in said first position on said insulating support means, said securing means being adjustable to a non-securing position on said control device, said arc-hood device being slidable on said insulating support means from said first position to a second position when said movable contact structures are in the open position and said securing means is in said non-securing position, when said arc-hood device is in said second position on said insulating support means said front-adjustable terminal devices being uncovered and accessible for front adjustment, said arc-hood device comprising stop means to prevent operation of said movable contact structures to the closed position when said arc-hood device is in said second position.

References Cited by the Examiner

UNITED STATES PATENTS

| | | | |
|---|---|---|---|
| 2,654,011 | 9/1953 | Kingdon | 200—144 |
| 2,898,427 | 8/1959 | Nadeau | 200—144 |
| 3,035,140 | 5/1962 | Daly | 200—144 |
| 3,089,928 | 5/1963 | Rexroad | 200—50 |
| 3,122,615 | 2/1964 | Chace | 200—50 |

ROBERT K. SCHAEFER, *Primary Examiner.*

KATHLEEN H. CLAFFY, *Examiner.*

M. GINSBURG, *Assistant Examiner.*